United States Patent
Bai et al.

(10) Patent No.: US 12,416,379 B2
(45) Date of Patent: Sep. 16, 2025

(54) PIPE JOINT FOR QUICK RELEASABLE PIPE CONNECTOR ASSEMBLY AND QUICK RELEASABLE PIPE CONNECTOR ASSEMBLY

(71) Applicant: XIAMEN LOTA INTERNATIONAL CO., LTD., Fujian (CN)

(72) Inventors: Shuanglin Bai, Fujian (CN); Liming Ye, Fujian (CN); Chuanbao Zhu, Fujian (CN)

(73) Assignee: XIAMEN LOTA INTERNATIONAL CO., LTD., Xiamen (CN)

( * ) Notice: Subject to any disclaimer, the term of this patent is extended or adjusted under 35 U.S.C. 154(b) by 0 days.

(21) Appl. No.: 18/382,414

(22) Filed: Oct. 20, 2023

(65) Prior Publication Data

US 2024/0133498 A1 Apr. 25, 2024
US 2024/0229998 A9 Jul. 11, 2024

(30) Foreign Application Priority Data

Oct. 24, 2022 (CN) .......................... 202211303863.7
Oct. 24, 2022 (CN) .......................... 202222803108.7

(51) Int. Cl.
*F16L 37/098* (2006.01)
(52) U.S. Cl.
CPC .................................. *F16L 37/098* (2013.01)
(58) Field of Classification Search
CPC ..................................................... F16L 37/098
See application file for complete search history.

(56) References Cited

U.S. PATENT DOCUMENTS

| 5,112,084 | A | * | 5/1992 | Washizu | F16L 37/0987 |
| | | | | | 285/24 |
| 6,173,994 | B1 | * | 1/2001 | Ketcham | F16L 37/0985 |
| | | | | | 285/233 |
| 6,471,252 | B1 | * | 10/2002 | Moretti | F16L 37/098 |
| | | | | | 285/305 |
| 7,044,506 | B2 | | 5/2006 | Dong | |

(Continued)

FOREIGN PATENT DOCUMENTS

| CA | 2499787 | A1 | * | 1/2006 | ............ F16L 37/098 |
| CN | 204358306 | U | | 5/2015 | |
| CN | 106168312 | A | | 8/2016 | |

(Continued)

OTHER PUBLICATIONS

Search Report for CN application No. 2022113038637, dated Apr. 30, 2025.

*Primary Examiner* — James M Hewitt, II
(74) *Attorney, Agent, or Firm* — Zhong Law, LLC

(57) ABSTRACT

A pipe joint for quick releasable pipe connector assembly comprises: an annular part defining a central axis; a pair of shank parts arranged symmetrically with respect to the central axis and each with a free end away from the annular part, an inner surfaces of the pair of shank parts being spaced from each other in a direction away from the annular part; a buckling part connected between the annular part and the pair of shank parts and provided with a slot; wherein the pair of shank parts and the buckling part are configured to be elastically deformed under an external force to approach the central axis and to automatically reset when the external force disappears.

9 Claims, 5 Drawing Sheets

(56) References Cited

U.S. PATENT DOCUMENTS 9,027,969 B2 * 5/2015 Lin .................. F16L 37/084
                                                            285/361
2021/0388926 A1 12/2021 Martin et al.

FOREIGN PATENT DOCUMENTS

| CN | 217540025 U | 10/2022 |
| CN | 219062760 U | 5/2023 |
| DE | 102011107016 A1 | 3/2012 |

* cited by examiner

PIPE JOINT FOR QUICK RELEASABLE PIPE CONNECTOR ASSEMBLY AND QUICK RELEASABLE PIPE CONNECTOR ASSEMBLY

TECHNICAL FIELD

Present disclosure relates to bathroom equipment and in particular to a pipe joint and a quick releasable pipe connector assembly.

BACKGROUND

There are a large number of pipe joints in the market of bathroom equipment. Constrained by construction sites and deadlines, it is desirable to quickly release or assemble these pipe joints in an efficient and simple way. For example, U.S. Pat. No. 7,044,506B2, published on Feb. 10, 2005, proposed a connector assembly for releasably connecting a pair of pipes. In this patent, one pipe connector is buckled into another pipe connector and extrudes the connector from an opening with the aid of a press structure buckling onto the other pipe connector. Thereby the two pipe connectors can be disengaged from each other. The advantage of this solution lies in that tools can be eliminated and the operation could be performed by operator's hands only. However, the press structure in this solution is unfavorable for hand-held operation because the assembly process is entirely dependent on personal experience in the cramped and unobtainable conditions.

As a result, there is a demand in the industry for making an improvement to the pipe connecting structure for quick releasable pipe connector assembly.

SUMMARY

Present disclosure provides a pipe joint that could solve at least some of the above technical problems.

Present disclosure also provides a quick releasable pipe connector assembly utilizing the above improved pipe joint.

According to an aspect of present disclosure, a pipe joint is provided for a quick releasable pipe connector assembly. The pipe joint includes an annular part defining a central axis. It further includes a pair of shank parts being arranged symmetrically with respect to the central axis and each of them formed with a free end away from the annular part. The inner surfaces of the pair of shank parts are extended away from each other in a direction away from the annular part. At least one buckling part is interposed between the annular part and the pair of shank parts and provided with a slot. The pair of shank parts and the buckling part are configured to be elastically deformed under an external force to approach the central axis and to automatically reset when the external force is removed.

In some embodiments, there are two buckling parts being arranged symmetrically with respect to the central axis, and each of the two buckling parts is connected to one shank part.

In some embodiments, the buckling part includes a first section being connected to the annular part, and a second section being connected between the first section and the shank part. A step facing away from to the annular part is formed at the joint of the first section and the second section, and the step is configured as a slot.

In some embodiments, the first guiding slope is formed at the end of the buckling part being attached to the annular part.

In some embodiments, the two first guiding slopes are arranged opposite to each other at the end of the buckling part and the two first guiding slopes are close to each other in a direction away from the shank part.

In some embodiments, a step facing the annular part is formed at the connection point between the shank part and the buckling part, wherein the step forms an accommodating slot together with the slot.

In some embodiments, the annular part extends intermittently in a circumferential direction and forms an axially through notch at an interrupt.

In some embodiments, the shank part extends in an arc configuration around the central axis.

Another aspect of present disclosure provides a quick releasable pipe connector assembly. The assembly includes a first pipe and a pipe joint being the pipe joint of any one of above. The annular part is snapped to the first pipe, wherein a spacing is formed between the inner surface of the pair of shank parts and the outer surface of the first pipe. The assembly includes a second pipe having a collar adapted to form a snap fit with a slot of the buckling part.

In some embodiments, the second pipe is formed with an opening adjacent to the collar, wherein the buckling part is adapted to be at least partially embedded in the opening and to form a snap fit with the slot via the collar.

Other features and advantages of present disclosure may in part be apparent to those skilled in the art upon reading this disclosure, and in part may be described in conjunction with the accompanying drawings in the specific embodiments below.

BRIEF DESCRIPTION OF THE DRAWINGS

Hereinafter, embodiments of present disclosure are described in detail in connection with the accompanying drawings.

1—first pipe; 11—first collar; 12—second collar; 13—circumferential groove; 2—pipe joint; 21—annular part; 211—end face; 212—notch; 213—inner peripheral surface; 214—outer peripheral surface; 215—annular end face; 22—buckling part; 221—first section; 222—second section; 223—slot; 224—first guiding slope; 23—shank part; 231—inner surface; 3—second pipe; 31—second guiding slope; 32—opening; 33—collar

DETAILED DESCRIPTION OF THE INVENTION

The schematic embodiments of the pipe joint and the quick releasable pipe connector assembly disclosed herein are described in detail with reference to the accompanying drawings. Although the drawings are provided to present some embodiments of the invention, the drawings need not be drawn to the dimensions of the specific embodiments and certain features may be enlarged, removed or locally cut to better illustrate and explain the disclosure of the invention. Some of the components in the accompanying drawings can be positioned according to actual needs without affecting the technical effect. The phrases "in Fig.", "in Figs." or similar terms appeared in the specification need not refer to all of the accompanying drawings or examples.

Certain directional terms used hereinafter to describe the drawings, such as "inside", "outside", "above", "below" and other directional terms, may be understood to have their normal meanings and to refer to those directions involved in a normal view of the accompanying drawings. Unless otherwise indicated, the directional terms described in this specification follow substantially the conventional directions understood by those skilled in the art.

In present disclosure, the terms "first", "the first", "second", "the second" and similar terms do not indicate any order, number or importance, but are used to distinguish one component from others.

Figure 1:
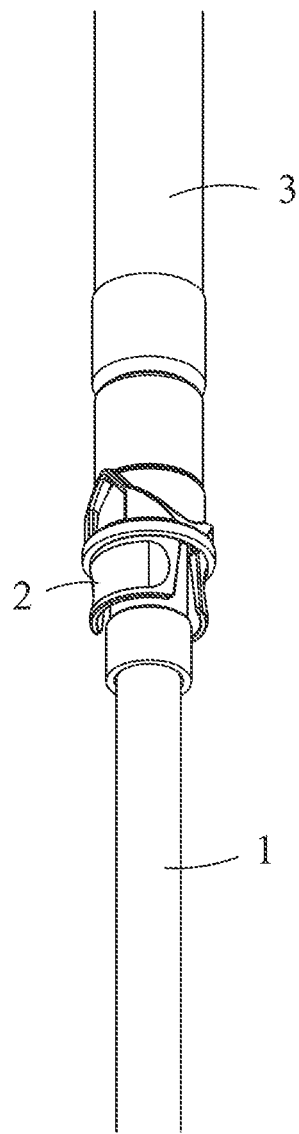
FIG. 1 is a schematic view of a quick releasable pipe connector assembly according to an embodiment of present disclosure.
Figure 2:
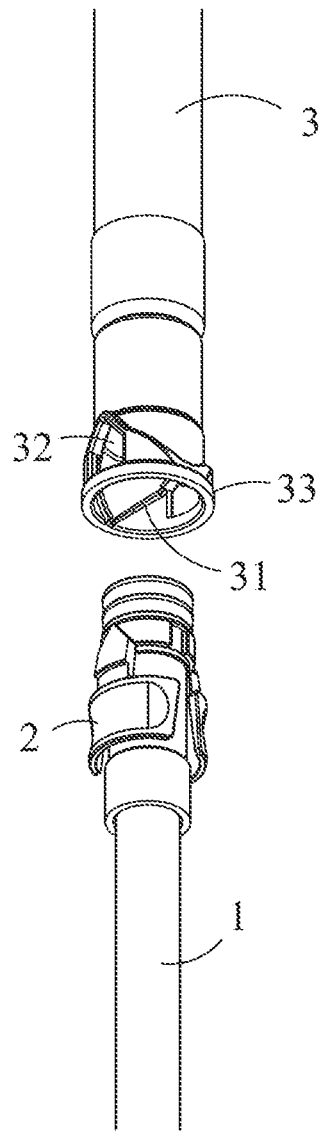
FIG. 2 is a schematic view of a quick releasable pipe connector assembly according to an embodiment of present disclosure, wherein the first pipe is separated from the second pipe.
Figure 3:
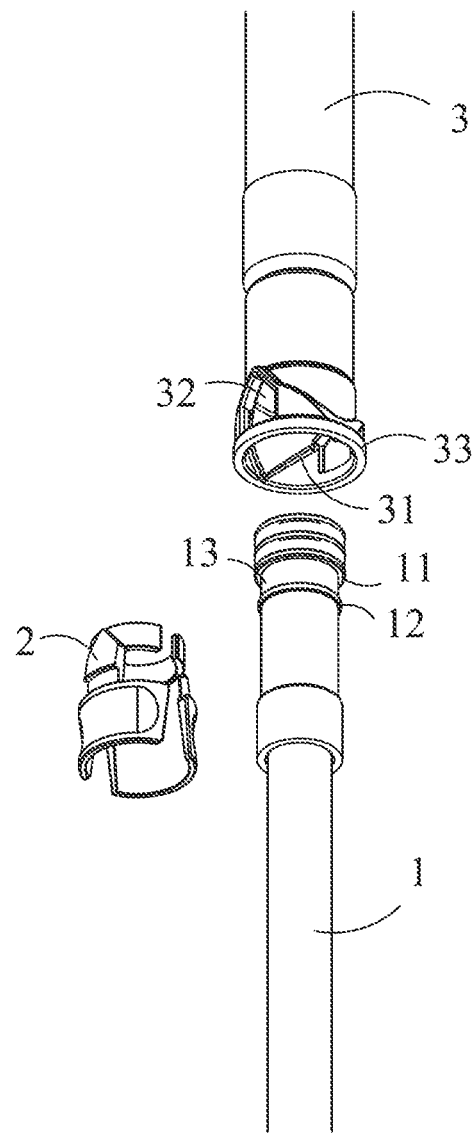
FIG. 3 is an exploded view of a quick releasable pipe connector assembly according to an embodiment of present disclosure.

FIGS. 1 to 3 exemplarily illustrate a quick releasable pipe connector assembly according to present disclosure. As shown, the quick releasable pipe connector assembly includes a first pipe 1, a pipe joint 2 and a second pipe 3, wherein the first pipe 1 and the second pipe 3 are snap-fitted together by means of the pipe joint 2.

The first pipe 1 could be constructed, for example, as a circular pipe with a first collar 11 and a second collar 12 axially spaced apart near its axial end and a circumferential groove 13 extending continuously in the circumferential direction of the first pipe 1 between the first collar 11 and the second collar 12. Alternatively, the first collar and the second collar could be omitted and a groove may be provided directly in the circumferential direction on the surface of the first pipe 1. In other embodiments not shown, the first pipe 1 could be constructed as a square pipe, or have other cross-sections, such as an elliptical cross-section. The first pipe 1 could be manufactured by a one-piece molding technique, such as injection molding.

Figure 4:
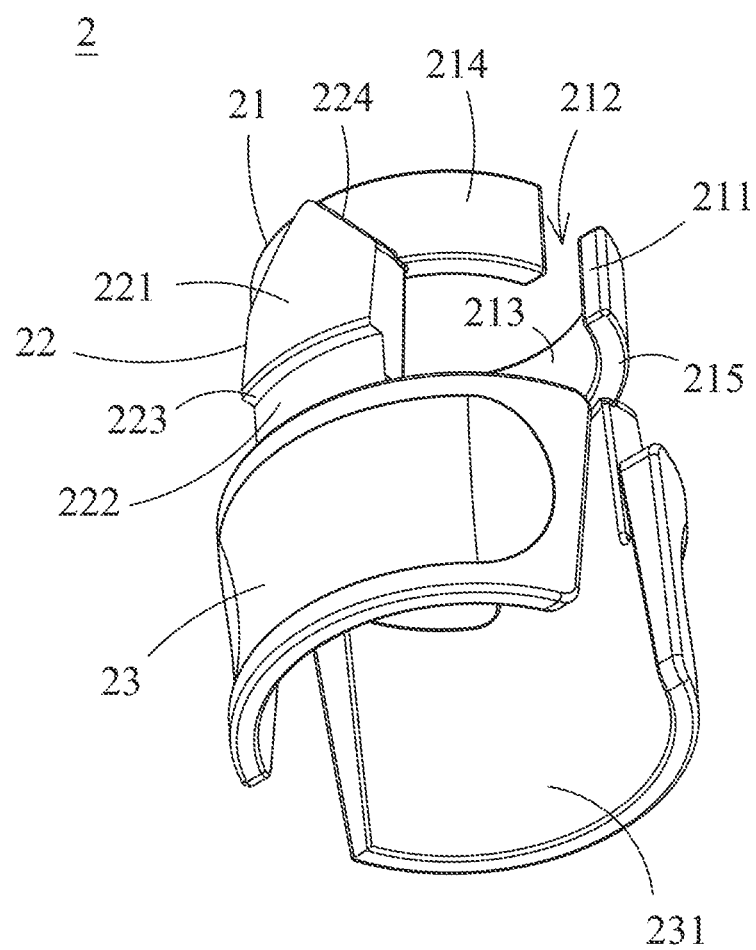
FIG. 4 is a schematic view of a pipe joint according to an embodiment of present disclosure.

FIG. 4 illustrates exemplarily a pipe joint 2 according to present disclosure, which is used to quickly disassembly and assembly the first pipe 1 and the second pipe 2, and it can be put in place regardless of the personal experience of the operator. As shown, the pipe joint 2 has an annular part 21, a buckling part 22 and a shank part 23. The annular part 21 has an inner circumference profile matched with the outer circumference of the first pipe 2 so as to be fitted on the first pipe 1. In the illustrated embodiment, the annular part 21 has two annular end surfaces 215 opposite to each other in the axial direction, an inner peripheral surface 213 and an outer peripheral surface 214 opposite to each other and sandwiched between the two annular end surfaces 215. At least the cross section profile of the inner peripheral surface 214 is matched with the cross section profile of the outer peripheral surface of the first pipe 1, such that annular part 21 could be tightly rested against the outer peripheral surface of the first pipe 1.

In order to limit the axial movement of the pipe joint 2 along the first pipe 1, the annular part 21 can be embedded into the circumferential groove 13, by means of which the pipe joint 2 can be rotated relative to the first pipe 1 but cannot be moved along the axial and radial direction. In addition, the pipe joint 2 is a separate member independent of the first pipe 1, and in order to facilitate in snapping the pipe joint 2 onto or removing it from the first pipe 1, the annular part 21 is discontinuous, i.e., interrupted, in the circumferential direction. As shown in FIG. 4, the annular part 21 is formed with a notch 212 running through in the axial direction. At the notch 212, a pair of end surfaces 211 being arranged relative to each other serves as two end cutoff surfaces of the annular part 21 in the circumferential direction. The annular part 21 could be slightly deformed to expand the notch 212, thereby allowing the first pipe 1 to enter into or disengage from the annular part 21 via the notch 212, enabling the assembly or disassembly of the pipe joint 2 and the first pipe 1.

A pair of buckling parts 22 is attached to the annular part 21 and is symmetrical with respect to the central axis of the annular part 21. The buckling part 22 includes a first section 221 being attached to the annular part 21 and a second section 222 extending from the first section 221 in a direction away from the annular part 21, and a stepped slot 223 facing away from the annular part 21 is provided at the joint of the first section 221 and the second section 222. As shown in FIG. 4, the first section 221 could be attached to the outer periphery surface of the annular part 21. In the illustrated embodiment, the thickness of the first section 221 is greater than the thickness of the second section 222 so that the slot 223 can be formed at the joint of the first section and the second section. However, it may be understood by those skilled in the art that the slot 223 is not limited to this, provided that the distance between the outer surface of the first section 221 and the central axis of the annular part 21 is greater than the distance between the outer surface of the second section 222 and the central axis of the annular part 21 so as to create a height difference between the outer surface of the first section 221 and the outer side of the second section 222.

In one embodiment, the outer surface of the first section 221 of the buckling part 22 is obliquely arranged at an angle relative to the central axis of the annular part 21 such that the first sections 221 of the two buckling parts 22 are arranged away from each other in a direction away from the annular part 21. This configuration facilitates in fitting the buckling parts 22 into the snap opening of the second pipe 3, as may be described in detail later.

In order to accurately snap the pipe joint 2 into the predetermined position of the second pipe 3, the orientation of the tube joint part 2 relative to the second pipe 3 may be defined. In many installations, the operator is not allowed to visually observe the insertion orientation of the pipe joint 2 relative to the second pipe 3 directly, resulting in that the operator may blindly guess whether the pipe joint 2 has been aligned with, ascertain and adjust the orientation of the pipe joint 2 during the insertion process relying on personal experience. This usually results in adjusting or even disassembling the pipe joint 2 repeatedly, which may increase the difficulty and reduce the efficiency of joining the pipe joints, and may even lead to breakage at the pipe joint. To overcome these problems, in present disclosure, a first guiding slope 224 is formed at the end of the first section 221 near the annular part 21. The first guiding slope 224 is arranged in a way that corresponds to the arrangement of the second guiding slope 31 in the second pipe 3. With the help of the first guiding slope 224 and the second guiding slope 31, the pipe joint 2 could be automatically guided to the intended mounting position on the second pipe 3 without visual supervised by the operator.

In one embodiment, a pair of opposed first guiding slope 224 is formed at the end of the first section 221 of the pipe joint 2. The first guiding slopes 224 are away from each other in a direction close to the second section 222, thereby forming a sharp angle-like structure at the end of the first section 221.

A shank part 23 is attached to the end of each buckling part 22 away from the annular part 21, respectively. As shown in FIG. 4, the two shank parts 23 are arranged symmetrically with respect to the central axis of the annular part 21, and each shank part 23 extends arcuately around this central axis beyond the opposite ends of the attached buckling part 22. This is advantageous to increase the hand-gripping area of the shank part 23 and facilitate the application of force by the operator. The inner surface of the shank part 23 is formed as an inclined surface or slope, such that the inner surfaces of the two shank parts 23 can be moved away from each other in a direction away from the annular part 21. Such a configuration helps the operator to squeeze the shank part 23 and cause the elastic deformation of the buckling part 22 to remove the pipe joint 2 from the second pipe 3.

In the illustrated embodiment, a step facing the annular part 21 is formed at the joint of the shank part 23 and the buckling part 22. This step and the step (slot 223) between the first section 221 and the second section 222 of the buckling part 22 are arranged opposite to each other, thereby together forming an accommodating slot. The outer surface of the second section 222 serves as the bottom surface of the accommodating slot.

Although the annular part 21 is shown to be connected with two buckling parts 22, it would be understood by those skilled in the art that there can be single one buckling part, one side thereof is attached to a pair of shank parts 23 and the other side thereof is attached to the annular part 21, formed with a slot 223. This single buckling part is resilient so that it could be deformed inwardly when the shank parts 23 are pressed to disengage the buckling part from the second pipe 3.

The pipe joint 2 could be manufactured by a one-piece molding process (such as injection molding), it is somewhat elastic, so that it could be slightly deformed under the application of external force and automatically returned to its original shape after the external force is removed.

The second pipe 3 could be constructed, for example, as a circular pipe with a circumferential collar 33 formed at one end to snap into the slot 223 of the pipe joint 2, such that the first pipe 1 can be connected with the second pipe 3. A pair of openings 32 (which are symmetrical with respect to the central axis of the second pipe 3) are formed immediately adjacent to the collar 33 for attaching to the two buckling parts 22 of the pipe joint apart 2. As described above, a second guiding slope 31 is formed on the inner wall of the second pipe 3. The second guiding slope 31 can protrude from the inner surface of the second pipe 3 and obliquely extend at an angle from the circumferential collar 33 of the second pipe 3 to the opening 32. A second guiding slope 31 can be provided at the opposite sides of each opening 32, so as to guide the pipe joint 2 which are inserted into the second pipe 3 from various angular positions.

In other embodiments not shown, the first pipe 1 may be constructed as a square pipe, or have other cross-sections, such as an elliptical cross-section. The first pipe 1 may be manufactured by a one-piece molding technique, such as injection molding.

Figure 5A:
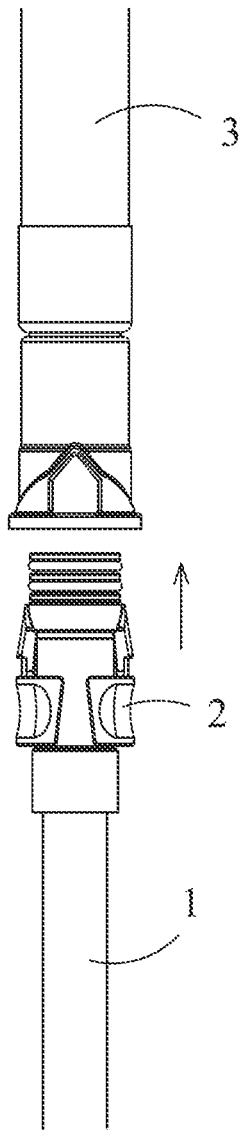
FIGS. 5A to 5C are schematic views of the assembly process of a quick releasable pipe connector assembly according to an embodiment of present disclosure.
Figure 5B:
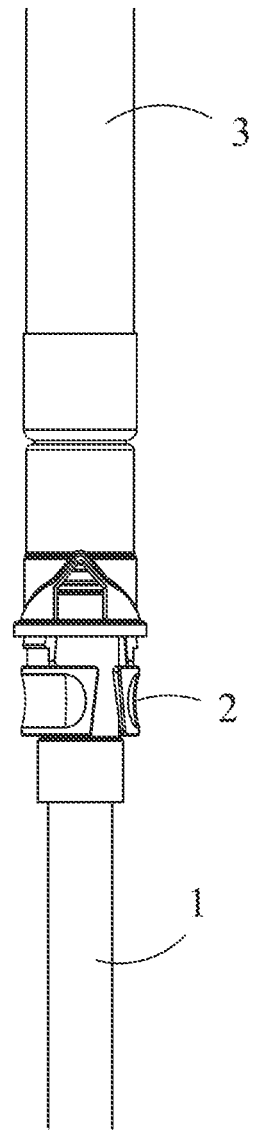
Figure 5C:
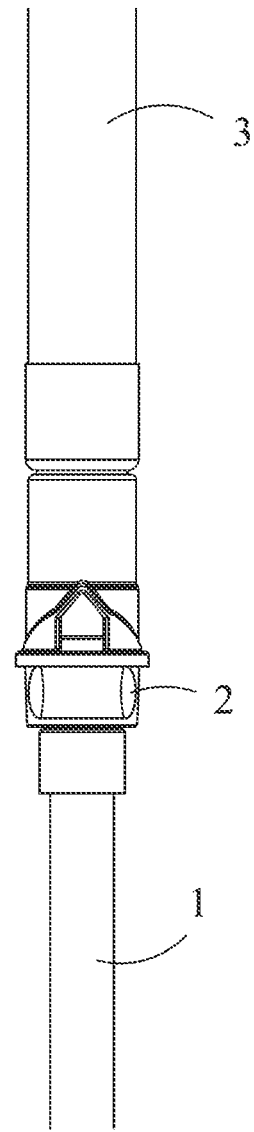

The following is a detailed description of the assembly process of the quick releasable pipe connector assembly according to present disclosure in conjunction with FIGS. 5A to 5C.

As shown in FIG. 5A, the annular part 21 of the pipe joint apart 2 is snapped onto the first pipe 1 and interposed within the circumferential groove 13. At this point, a spacing is formed between at least a portion of the inner surface of the buckling part 22 and the outer circumferential surface of the first pipe 1, and a spacing is also formed between the entire inner surface 231 of the shank part 23 and the outer surface of the first pipe 1.

Bringing the first pipe 1 close to the second pipe 3 in the direction of the arrow until the annular portion 21 and a portion of the buckling part 22 of the pipe joint 2 are inserted into the inner hole of the second pipe 3. As previously described, the outer surface of the first section 221 of the buckling part 22 is inclined or sloped such that the distance between the ends of the first section 221 of the two buckling parts 22 near the annular part 21 is less than the inner diameter of the second pipe 2, while the distance between the ends of the first section 221 of the two buckling parts 22 away from the annular part 21 is greater than the inner diameter of the second pipe 2. In this way, when inserting the pipe joint 2 into the second pipe 3, the two buckling parts 22 can be gradually pressed inward to build up force.

As shown in FIG. 5B, without specifically looking for the angle of insertion, there is a high probability that the buckling part 22 of the pipe joint 2 would not be snapped directly into the opening 32 of the second pipe 3. At this point, the buckling part 22 of the pipe joint 2 may touch the second guiding slope 31 in the second pipe 3. In one embodiment, the angle of inclination of the first guiding slope 224 of the buckling part 22 is substantially identical with the angle of inclination of the second guiding slope 31 of the second pipe 3, such that the first guiding slope 224 can be rested against the second guiding slope 31 during the insertion process. Once the buckling part 22 of the pipe joint 2 touches the second guiding slope 31 in the second pipe 3, the buckling part 22 of the pipe joint 2 could be moved along the second guiding slope 31 until the buckling part 22 is aligned with and snapped into the opening of the second pipe 3 by means of simply turning the pipe joint 2. There is no need to find a specific assembly angle during insertion, ensuring that the pipe joint 2 would be properly assembled in place regardless of the orientation of the pipe joint 2 relative to the second pipe 3. The whole process may not need the operator to visually supervise or repeatedly adjust by hand, experience, etc., because adjusting the orientation of the pipe joint 2 could be done automatically during the insertion process. When the pipe joint 2 moves along the second guiding slope 31 to its end, the buckling part 22 could be released and automatically embedded in the opening 32 of the second pipes 3, the assembly is completed.

FIG. 5C illustrates the assembled quick releasable pipe connector assembly.

The disassembly process of the quick releasable pipe connector assembly would be described in detail below in conjunction with FIGS. 6A through 6B.

Figure 6A:
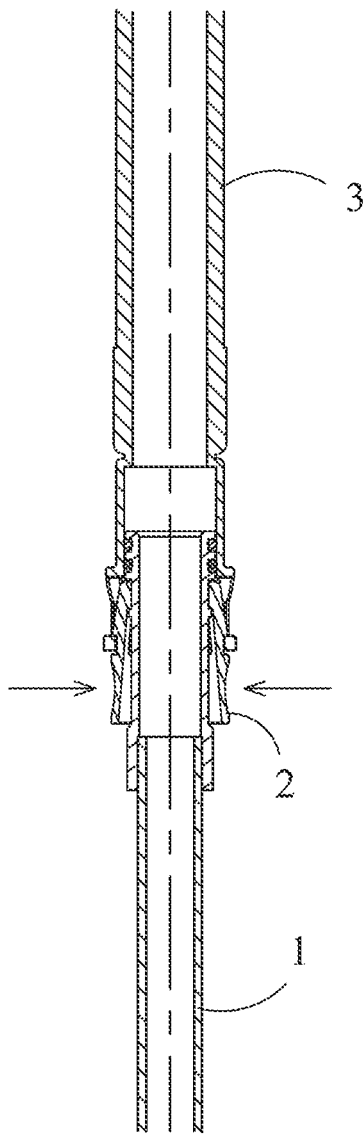
FIGS. 6A and 6B are schematic views of the disassembly process of a quick releasable pipe connector assembly according to an embodiment of present disclosure.

As shown in FIG. 6A, squeezing the two shank parts 23 in a direction close to the center axis of the second pipe 3 drives the buckling part 22 together to retract inwardly in a direction close to the center axis, until the first section 221 of the buckling part 22 could be accommodated in the second pipe 3.

Figure 6B:
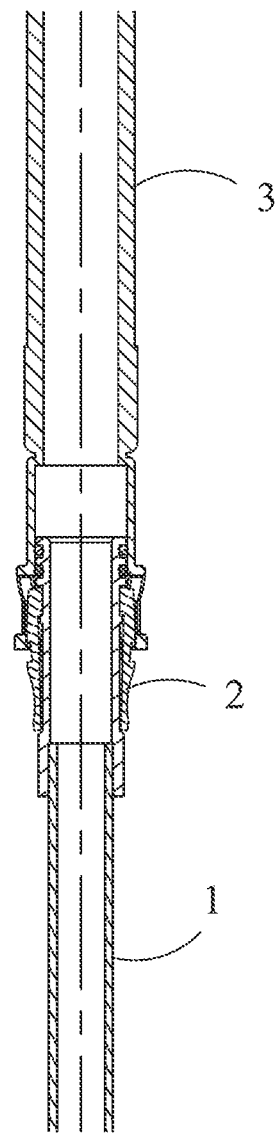

As shown in FIG. 6B, at this point, the pipe joint 2 together with the first pipe 1 could be pulled out by applying force in the direction away from the second pipe 3. The process of squeezing the shank part 23 and pulling out the pipe joint 2 could be done in one step. After the external force is removed, the shank part 23 and the buckling part 22 can automatically return to their original shape and be ready for the next assembly.

It should be understood that although the specification is described in terms of individual embodiments, not each embodiment contains merely one separate technical solution. The specification is described in this manner merely for the sake of clarity. A person skilled in the art may consider the specification as a whole. The technical solutions in each embodiment may also be suitably combined to form other embodiments that can be understood by those skilled in the art.

The foregoing is merely a schematic and specific embodiment of the invention and is not intended to limit the scope of the invention. Any equivalent changes, modifications and combinations made by any person skilled in the art, without departing from the conception and principles of present disclosure, shall fall within the scope of protection of present disclosure.

What is claimed is:

1. A pipe joint for a quick releasable pipe connector assembly to allow a first pipe and a second pipe to be jointed together by the pipe joint, wherein the pipe joint is elastic and comprises:
    an annular part defining a central axis and releasably coupled to the first pipe;
    a pair of buckling parts respectively attached to the annular part and for releasable attachment to the second pipe, wherein each buckling part is provided with a slot;
    a pair of shank parts being arranged symmetrically with respect to the central axis, and each attached to an end of one of the pair of buckling parts away from the annular part, wherein the end of each shank part away from the annular part is formed as a free end, and wherein an inner surface of each shank part is formed as an inclined surface such that the inner surfaces of the pair of shank parts are extended away from each other in a direction away from the annular part;
    wherein the pair of shank parts and the pair of buckling parts are configured to be elastically deformed under an external force, such that when squeezing the pair of shank parts in a direction towards the central axis, the pair of buckling parts can be driven together to contract inwardly towards the center axis, and the pair of shank parts as well as the pair of buckling parts can automatically reset when the external force is removed.

2. The pipe joint according to claim 1, wherein each buckling part comprises:
    a first section being connected to the annular part;
    a second section being interposed between the first section and the shank part,
    wherein a step facing away from the annular part is formed at a joint of the first section and the second section, and the step is configured as the slot.

3. The pipe joint according to claim 1, wherein an end of each buckling part being attached to the annular part is provided with a first guiding slope.

4. The pipe joint according to claim 3, wherein the two first guiding slopes at the end of each buckling part are arranged opposite to each other and the two first guiding slopes are converge towards each other in a direction away from the shank part.

5. The pipe joint according to claim 1, wherein a step facing the annular part is formed at a connection point between each shank part and corresponding buckling part, wherein the step forms an accommodating slot together with the slot.

6. The pipe joint according to claim 1, wherein the annular part extends intermittently in a circumferential direction and forms an axially through notch at an interrupt.

7. The pipe joint according to claim 1, wherein each shank part extends in an arc configuration around the central axis.

8. A quick releasable pipe connector assembly, comprising:
    a first pipe;
    a pipe joint according to the pipe joint of claim 1, wherein the annular part is coupled to the first pipe and a spacing is formed between an inner surface of the pair of shank parts and an outer surface of the first pipe;
    a second pipe having a collar being adapted to snap into the slot of each buckling part of the pipe joint, so as to form a snap fit.

9. The quick releasable pipe connector assembly according to claim 8, wherein the second pipe is formed with an opening adjacent to the collar and each buckling part is adapted to be at least partially engaged in the opening.

* * * * *